US012077400B2

(12) United States Patent
Xu

(10) Patent No.: US 12,077,400 B2
(45) Date of Patent: Sep. 3, 2024

(54) LABEL PRINTER

(71) Applicant: Xiamen iPrt Technology Co., Ltd., Fujian (CN)

(72) Inventor: Shuangquan Xu, Fujian (CN)

( * ) Notice: Subject to any disclaimer, the term of this patent is extended or adjusted under 35 U.S.C. 154(b) by 197 days.

(21) Appl. No.: 17/727,264

(22) Filed: Apr. 22, 2022

(65) Prior Publication Data

US 2023/0339712 A1 Oct. 26, 2023

(51) Int. Cl.
*B65H 16/02* (2006.01)
*B41J 3/407* (2006.01)

(52) U.S. Cl.
CPC ............ *B65H 16/02* (2013.01); *B41J 3/4075* (2013.01); *B65H 2601/10* (2013.01); *B65H 2601/255* (2013.01); *B65H 2801/75* (2013.01)

(58) Field of Classification Search
CPC ................ B65H 16/02; B65H 2601/10; B65H 2601/255; B65H 2801/75; B41J 3/4075
See application file for complete search history.

(56) References Cited

U.S. PATENT DOCUMENTS

2014/0147187 A1* 5/2014 Jo ............................ B41J 29/13 400/613
2017/0072723 A1* 3/2017 Yamanaka ............... B41J 29/13

FOREIGN PATENT DOCUMENTS

| | | | |
|---|---|---|---|
| CN | 113829763 | A | 12/2021 |
| CN | 113910788 | A | 1/2022 |
| CN | 114179526 | A | 3/2022 |
| JP | 9-314872 | * | 12/1997 |
| JP | 2004-358744 | * | 12/2004 |
| KR | 20-0231786 | * | 7/2001 |

* cited by examiner

*Primary Examiner* — Thomas A Morrison

(57) ABSTRACT

The present invention provides a label printer, including an upper cover module and a bottom case module configured to cooperate with the upper cover module in printing. An elastic wall is disposed at an articulating part between the upper cover module and the bottom case module. An inclined surface is provided at a corresponding position of the lower cover module. When the upper cover is opened upward to the maximum extent, a tail end of the elastic wall cooperates with the inclined surface to form a support structure to prevent the upper cover module from falling due to the gravity and the like when the upper cover module is opened.

7 Claims, 8 Drawing Sheets

LABEL PRINTER

FIELD OF TECHNOLOGY

The present invention relates to the field of printers, in particular to a label printer.

BACKGROUND hi the printing process of a label printer, paper may be jammed. To resolve this problem, the printing part needs to be opened upwards. When the paper is replaced, the part opened upward may be touched by mistake and fall back heavily due to the gravity. If such a phenomenon occurs many times, the printer may be damaged. Some other printers with locking mechanisms have relatively complex structures, are larger in size, take up more space, and are not suitable for desktop use. In addition, because the printer paper needs to be replaced frequently when the printer operates, in the existing printer, the connecting shaft is disposed on one side of the paper feed channel. After the printer is opened, the upper cover module is still located above the paper feed channel and is likely to block a hand when it replaces the paper.

SUMMARY

An objective of the present invention is to provide a label printer, including an upper cover module provided with a printing device and a bottom case module configured to cooperate with the upper cover module in printing, where the upper cover module is buckled above the bottom case module, one side of the upper cover module is hinged with one side of the bottom case module, and the upper cover module is buckled downward or opened upward along the side hinged with the bottom case module; and the other side of the upper cover module is provided with a toggle hook having a toggle block, the bottom case module is provided with a buckle groove corresponding to a position of the toggle hook, and the toggle hook cooperates with the buckle groove in buckling to lock the upper cover module and the bottom case module.

According to the printer of the present invention, after the upper cover module is opened, the space above the paper feed channel is completely unobstructed, which facilitates to replace printer paper.

Further, when the upper cover module is buckled with the bottom case module, a print channel is formed between the upper cover module and the bottom case module, a paper feed is disposed at one end of the print channel, and a paper exit is disposed at the other end; and the upper cover module includes an upper cover, the upper cover is disposed outside the upper cover module, the upper cover module is internally provided with an upper middle cover, the upper middle cover is fixedly connected to the upper cover, a stacker roller is disposed on one side of the upper middle cover close to the paper feed and is configured to flatten the print label paper during the printing, thereby preventing the paper from being jammed due to the curling of the label paper, and a print head assembly is mounted on one side of the upper middle cover close to the paper exit.

Further, the bottom case module includes a bottom case, a lower middle cover is detachably connected to a top of the bottom case, a slide groove is disposed on one side of an upper surface of the lower middle cover close to the paper feed, the slide groove communicates with the inside of the bottom case module, the slide groove is internally provided with a paper limiter, and the paper limiter limits a specific clamping position of the label paper when the label paper enters the printer; a mounting groove is disposed on one side of the upper surface of the lower middle cover close to the paper exit, the mounting groove communicates with the inside of the bottom case module, and the mounting groove is internally mounted with a rubber roller shaft configured to guide paper; and the bottom case module is further internally mounted with a motor and a transmission mechanism that are configured to drive the rubber roller shaft and a controller configured to control the motor to drive and to control printing, and the controller is electrically connected to the print head assembly and the motor. When receiving a printing signal, the controller drives the rubber roller to guide the paper forward, and the print head assembly prints the printer paper above the rubber roller.

Further, an elastic wall is disposed on an inner side of an articulating part between the upper cover module and the upper middle cover, and the elastic wall is bent downward to form an arc-shaped structure; and one end of the lower middle cover in contact with the elastic wall is inclined inward to form an inclined surface, and when the upper cover module is rotated upward and opened relative to the bottom case module, a part of the arc-shaped structure of the elastic wall abuts against the inclined surface. When the upper cover module rotates upward relative to the bottom case module, the elastic wall is elastically deformed. When the upper cover module is rotated upward to the limit, the surface of a tail end of the elastic wall is in contact with the inclined surface of the lower middle cover. In this case, the elastic wall and the inclined surface form a support structure, which can support and position the upper cover module and prevent the upper cover module from falling down due to the gravity or touching by mistake.

Further, the paper limiter includes two racks in the same shape and size; a damping gear, where the two racks mesh with the damping gear for transmission, and a part of a gear shaft of the damping gear is fixedly connected to an inner side of the lower middle cover of the bottom case module; and paper limit sliders, disposed at bottoms of the two racks. When one of the racks is moved, the other rack is synchronously and reversely driven through transmission by the damping gear, and the paper limit sliders at both ends limit the position of the printer label paper to prevent the paper from moving freely during the printing.

Further, the print head assembly is provided with two jaws, the two jaws correspond to two ends of the rubber roller shaft respectively, and when the upper cover module is closed, the jaws are clamped with the two ends of the rubber roller shaft in a position, such that the print head assembly is attached to the printer label paper more closely on the rubber roller shaft, which improves the printing clarity.

Further, a tension spring is connected between the toggle hook and the upper cover module, and the tension spring facilitates to automatically reset the toggle hook.

Further, the upper middle cover is provided with an open groove, and the open groove is disposed at a corresponding position of the toggle hook; and the toggle block of the toggle hook protrudes from the open groove, which facilitates to operate the toggle hook to open and lock the upper cover module and the bottom case module.

It can be known through an analysis that in the label printer disclosed by the present invention, the upper cover module configured to print is hinged with the bottom case module configured to cooperate with the upper cover module in printing, and the toggle hook cooperates with the buckle groove to conveniently open and lock the printer, which facilitates to replace the printer paper. In addition, an elastic wall structure is disposed at one end of the upper middle cover in the upper cover module of the printer. An inclined surface is provided at a corresponding end of the lower middle cover in the lower cover module. When the upper cover module is opened upward to the maximum extent, a tail end of the elastic wall cooperates with the inclined surface to form a support structure to prevent the upper cover module from falling due to the gravity and the like when the upper cover module is opened.

The technical solution of the present invention decreases the operation difficulty, greatly reduces the time and operation intensity of label paper replacement, and saves costs.

BRIEF DESCRIPTION OF THE DRAWINGS

The accompanying drawings of this specification which constitute a part of the present application provide further comprehension of the present invention. The schematic embodiments of the present invention and description thereof are intended to explain the present invention and do not constitute an improper limitation to the present invention. In the drawings.

REFERENCE NUMERALS

Figure 1:
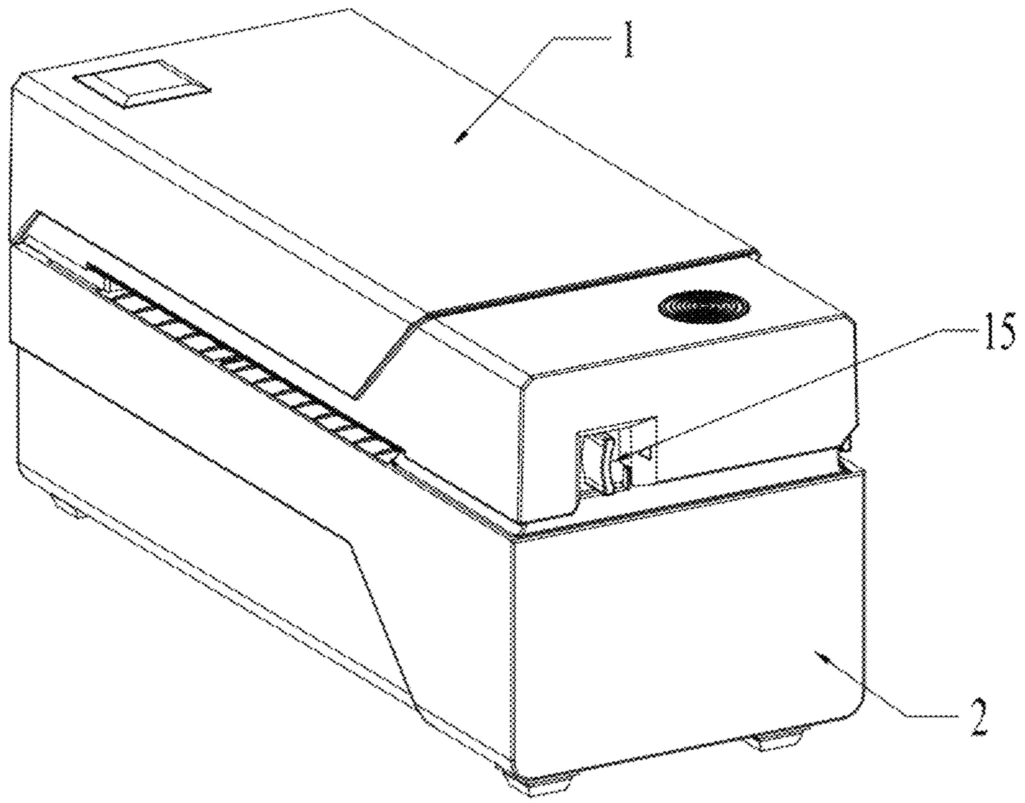
FIG. 1 is a schematic structural diagram of a printer in a buckled state according to an embodiment of the present invention.

1—Upper cover module; 2—Bottom case module; 3—Label paper; 11—Upper cover; 12—Upper middle cover; 13—Print head assembly; 14—Stacker roller; 15—Toggle hook; 16—Jaw; 17—Tension spring; 21—Bottom case; 22—Lower middle cover; 23—Transmission assembly; 24—Rubber roller shaft; 25—Buckle groove; 26—Paper limiter; 31—Paper feed; 32—Paper exit; 121—Elastic wall; 122—Open groove; 221—Slide groove; 222—Mounting groove; 261—Rack; 262—Damping gear; and 263—Paper limit slider.

DETAILED DESCRIPTION OF THE EMBODIMENTS

The present invention is described in detail below with reference to the accompanying drawings and the embodiments. Each example is provided through explanation in the present invention and does not limit the present invention. It is clear for those skilled in the art that modifications and variations can be made in the present invention without departing from the scope or spirit of the present invention. For example, some of the features illustrated or described in one embodiment can be used to form another embodiment. Therefore, it is intended that the present invention includes such modifications and variations falling within the scope of the appended claims and their equivalents.

In the description of the present invention, terms such as “longitudinal”, “transverse”, “upper”, “lower”, “front”, “rear”, “left”, “right”, “vertical”, “horizontal”, “top”, and “bottom”, indicate the orientation or position relationships based on the accompanying drawings, which are only beneficial to describe the present invention and do not require that the present invention must be constructed and operated in a particular orientation, and therefore should not be construed as a limitation of the present invention. The terms “interconnection”, “connection”, and “disposed” used in the present invention should be understood in a broad sense. For example, the connection may be a fixed connection or a detachable connection; a direct connection or an indirect connection by using intermediate components; or a wired electrical connection, a wireless electrical connection or a wireless communication signal connection. For those of ordinary skill in the art, the specific meanings of the terms can be understood according to specific situations.

One or more examples of the present invention are shown in the accompanying drawings. In the detailed description, numerals and letters are used to refer to features in the accompanying drawings. The similar reference numerals in the accompanying drawings and description are used to refer to similar parts of the present invention. As used herein, the terms “first”, “second”, “third”, and the like can be used interchangeably to distinguish one element from another, and are not intended to denote a position or importance of an individual element.

Figure 2:
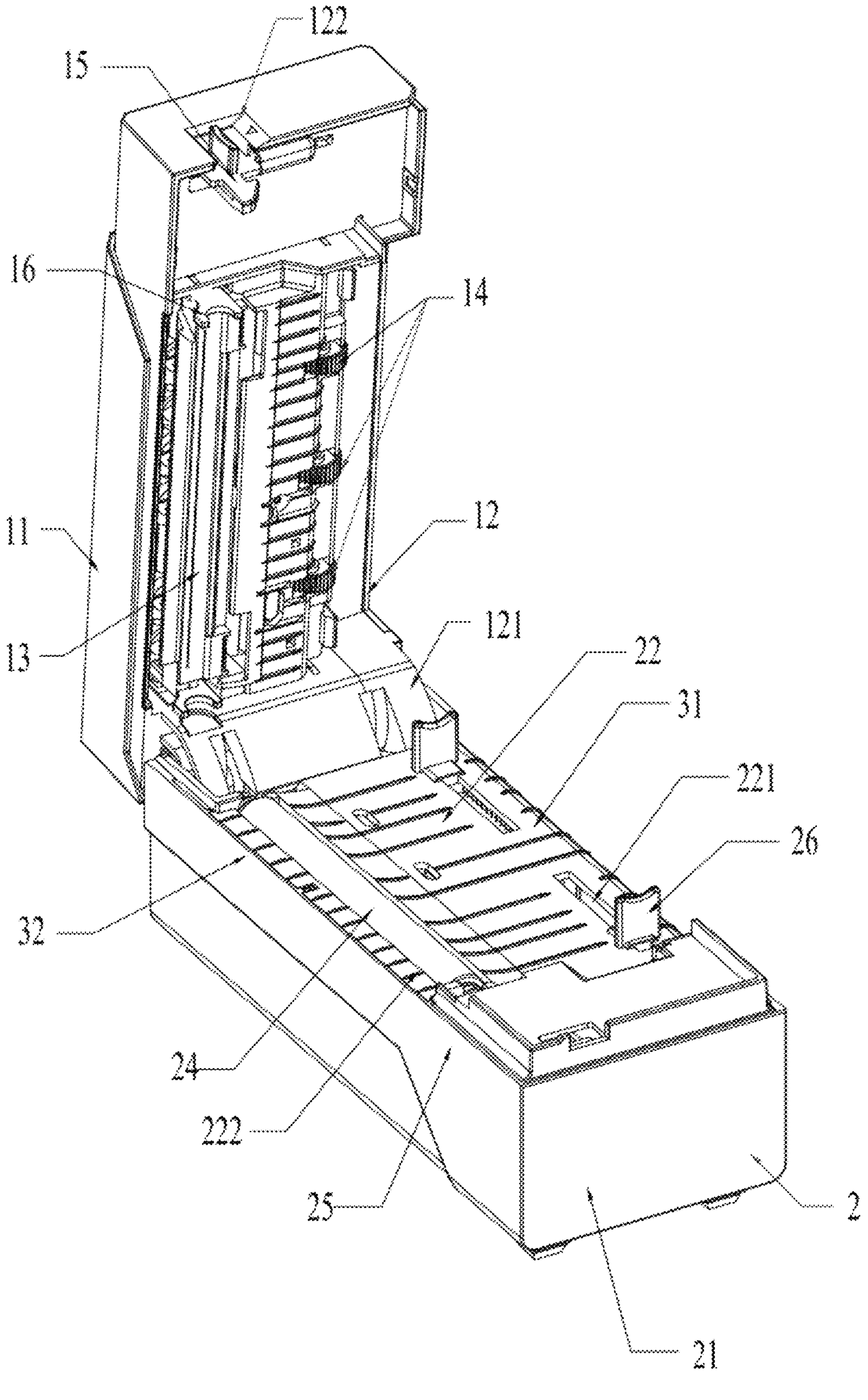
FIG. 2 is a schematic structural diagram of the printer in an unfolded state according to an embodiment of the present invention.
Figure 3:
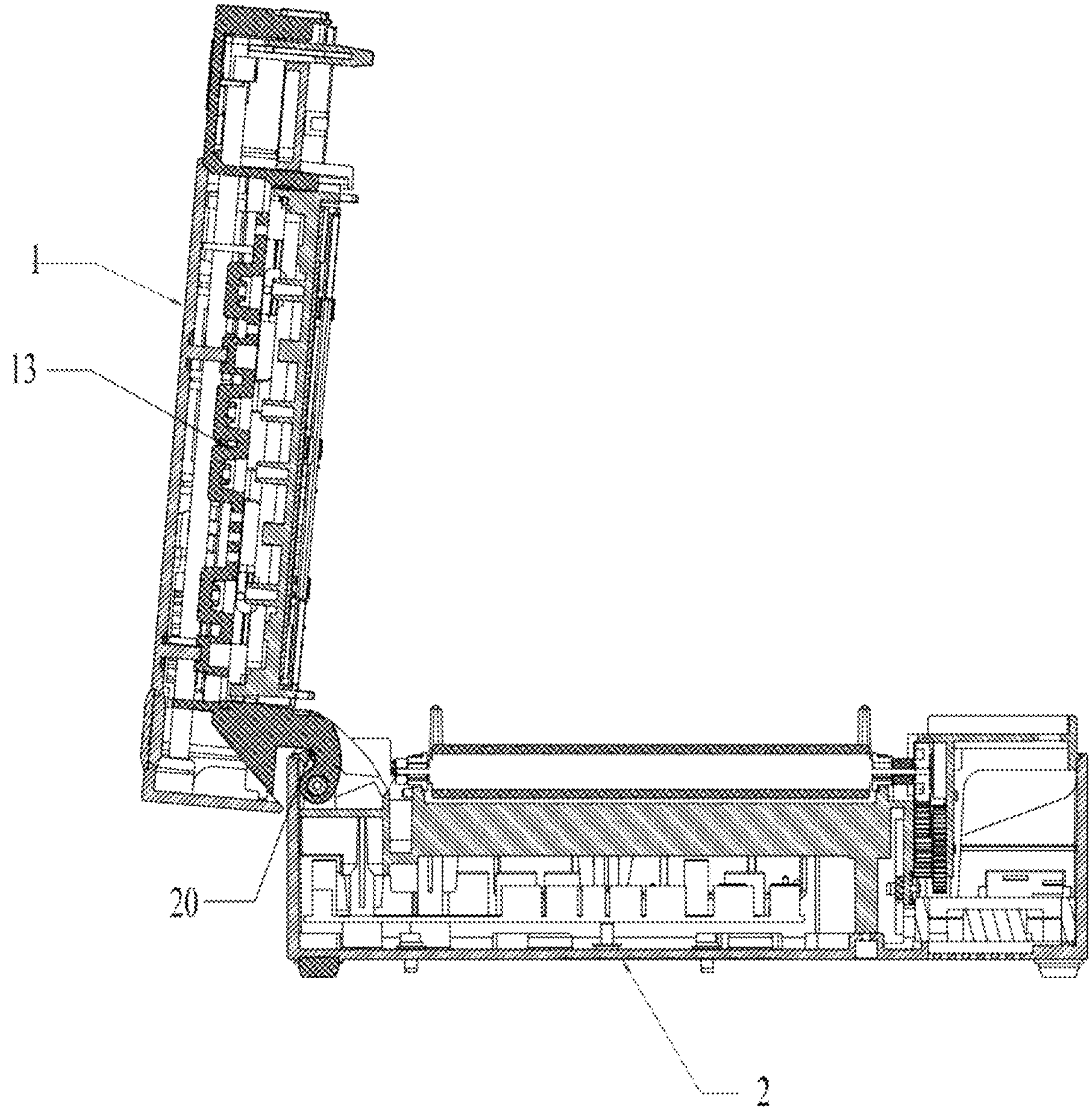
FIG. 3 is a schematic structural diagram of a cross section of the printer in the unfolded state according to an embodiment of the present disclosure.
Figure 4:
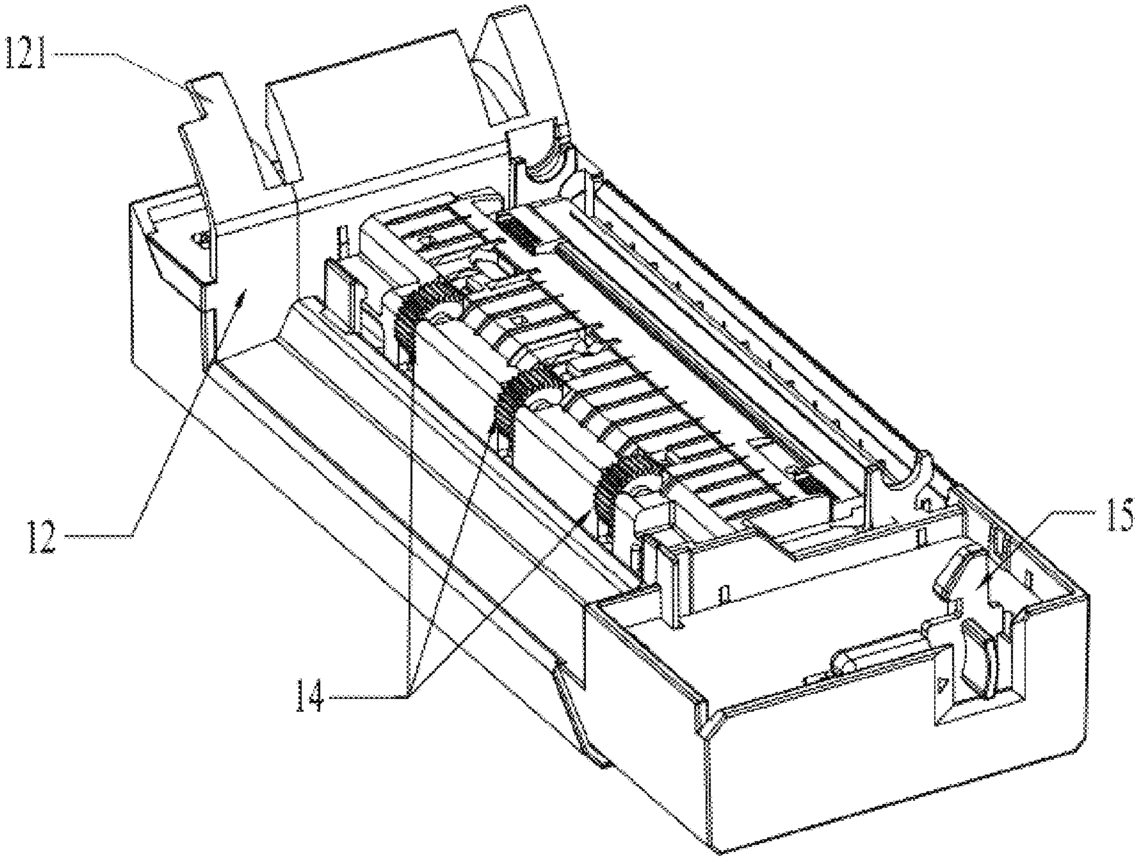
FIG. 4 is a schematic structural diagram of an upper cover module according to an embodiment of the present invention.
Figure 5:
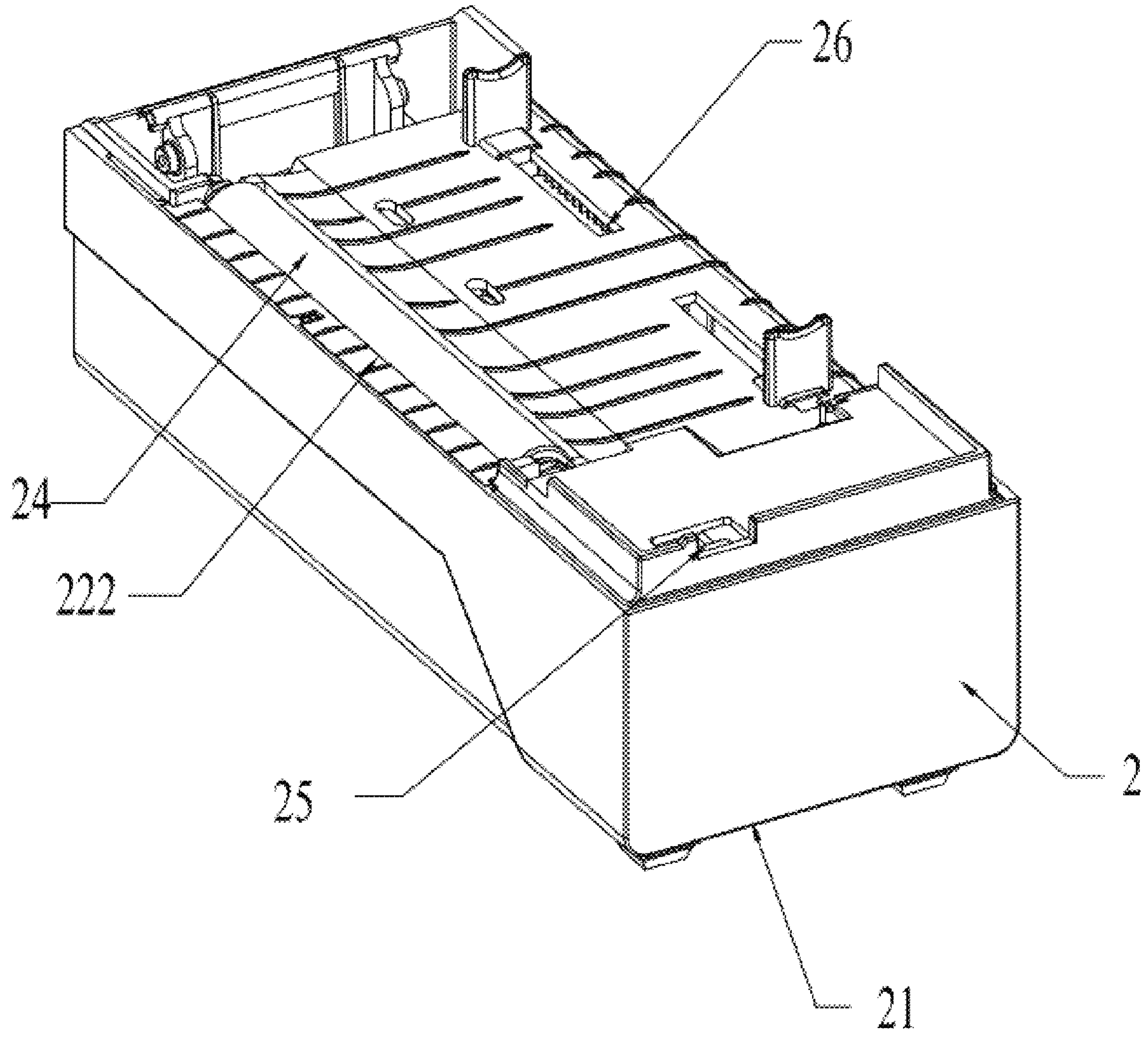
FIG. 5 is a schematic structural diagram of a bottom case module according to an embodiment of the present invention.
Figure 6:
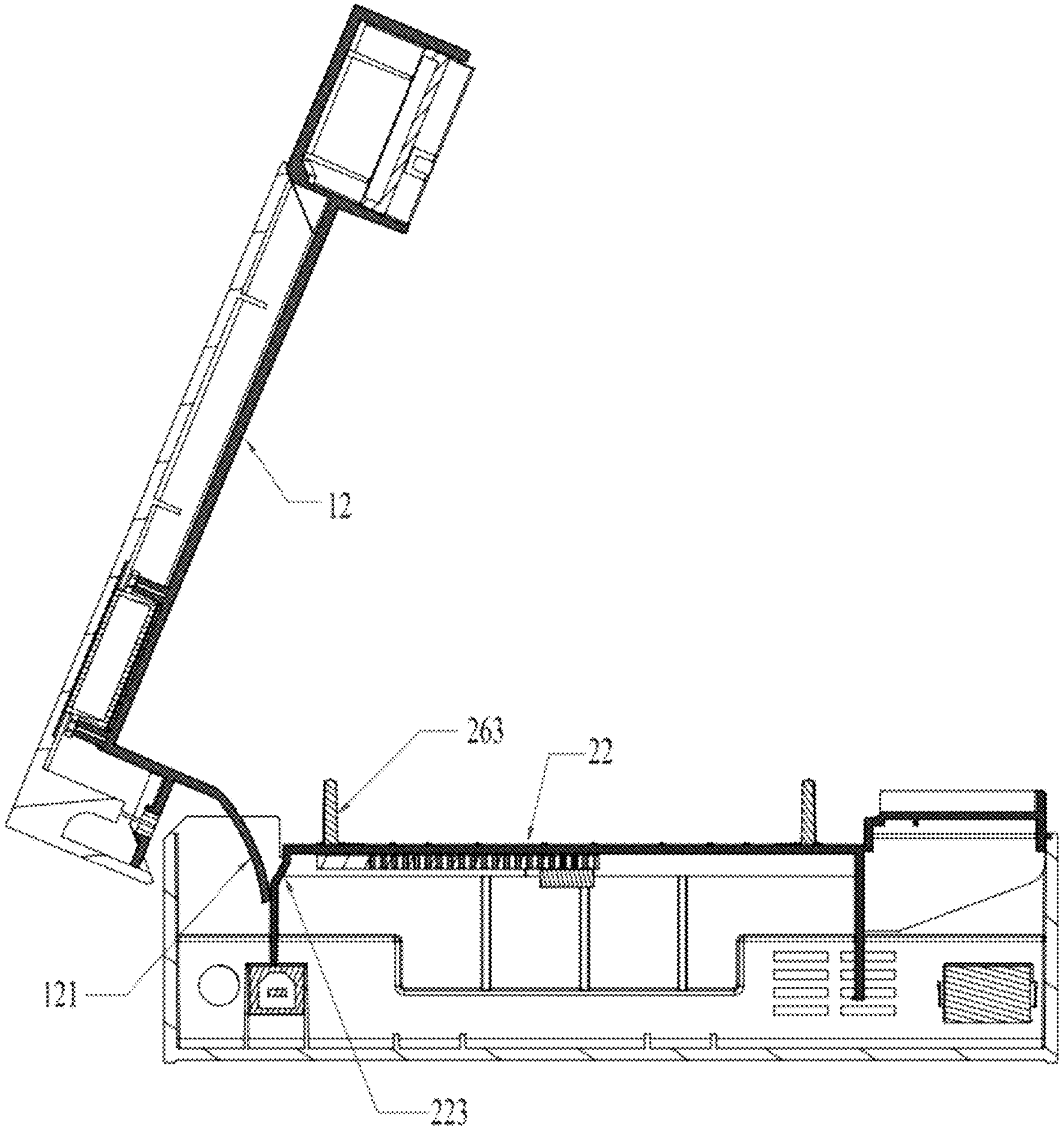
FIG. 6 is a schematic structural diagram of a cross section of an elastic wall according to an embodiment of the present disclosure.
Figure 7:
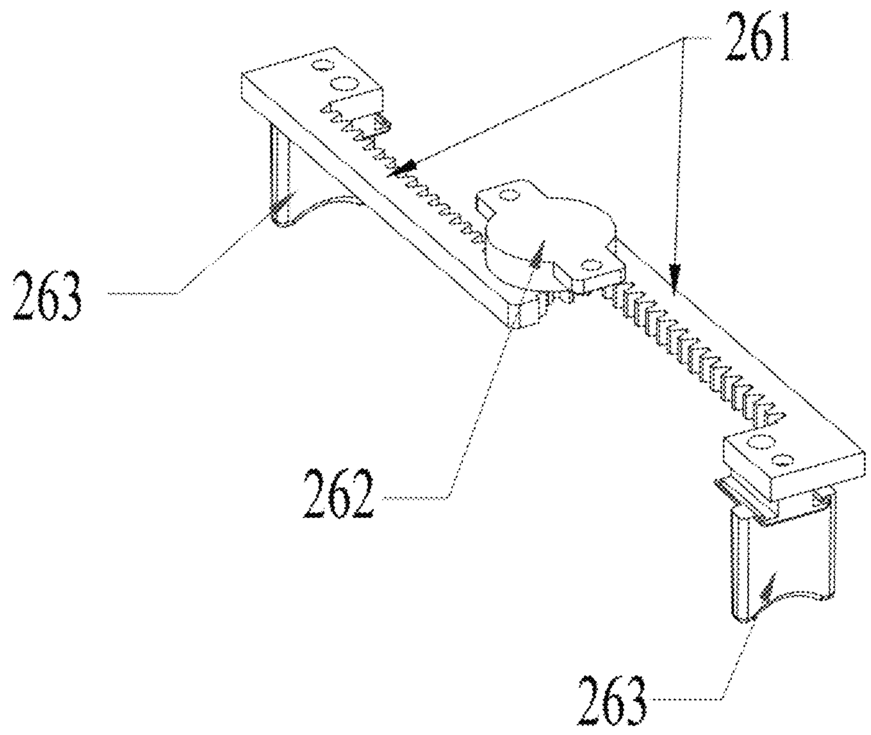
FIG. 7 is a schematic structural diagram of a paper limiter according to an embodiment of the present invention.
Figure 8:
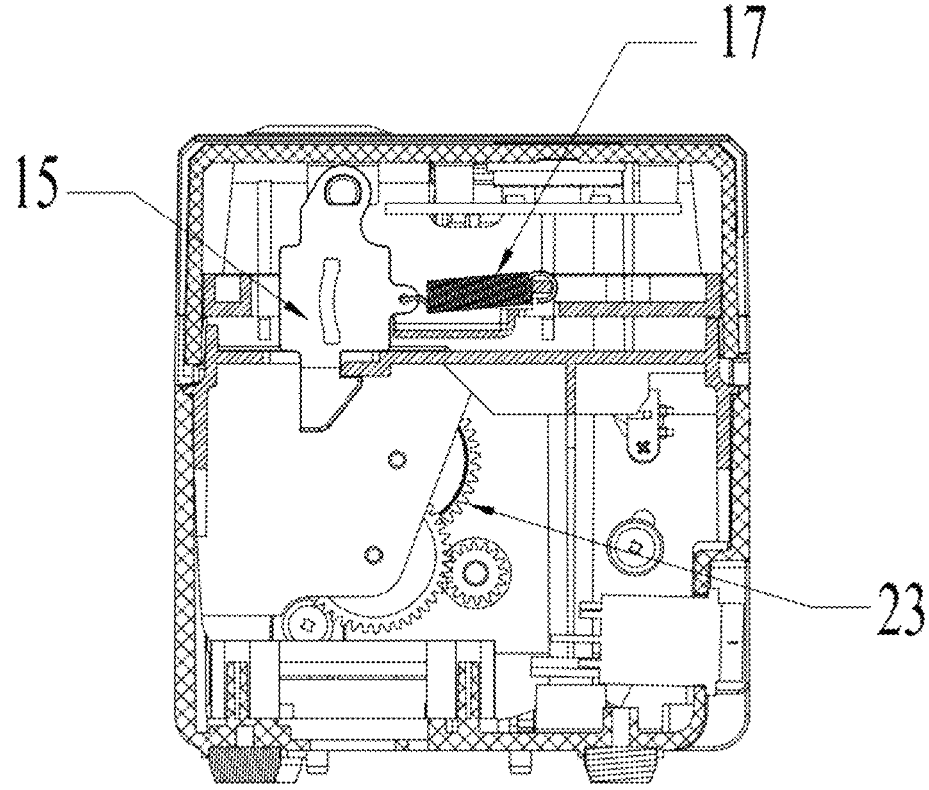
FIG. 8 is a schematic structural diagram of a cross section of a toggle hook according to an embodiment of the present disclosure.
Figure 9:
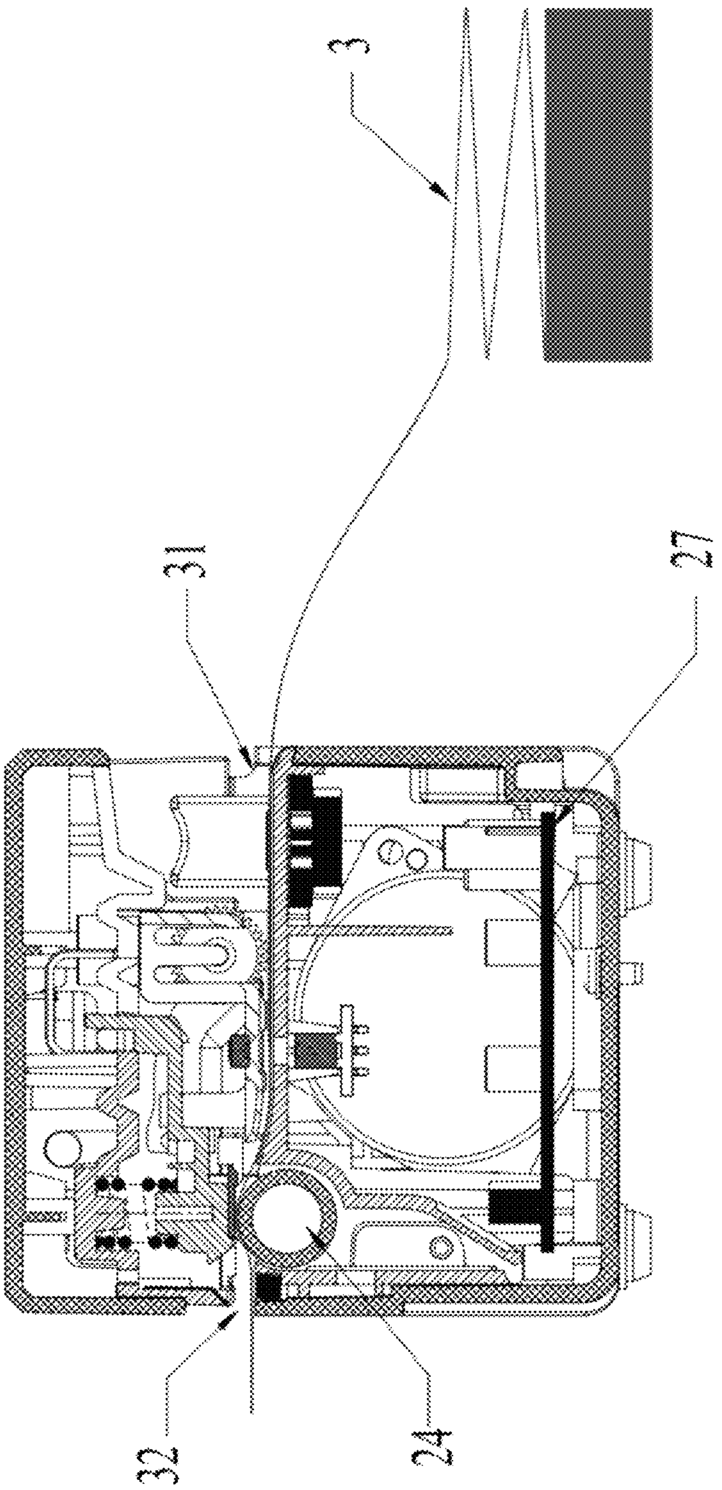
FIG. 9 is a schematic structural diagram of the printer in a printing state according to an embodiment of the present disclosure.

As show in FIG. 1 to FIG. 9, according to an embodiment of the present invention, a label printer is provided and includes an upper cover module 1 and a bottom case module 2. One end of the upper cover module 1 is hinged and buckled with one end of the bottom case module 2 above the bottom case module 2. A print channel is formed between the upper cover module 1 and the bottom case module 2. A paper feed 31 is disposed at one end of the print channel, and a paper exit 32 is disposed at the other end. A toggle hook 15 having a toggle block is disposed at the other end of the upper cover module 1. A position corresponding to the toggle hook 15 on the bottom case module 2 is provided with a buckle groove 25 that matches the toggle hook 15. The toggle hook 15 cooperates with the buckle groove 25 to close and lock the upper cover module 1 and the bottom case module 2.

The upper cover module 1 includes an upper cover 11 located outside the upper cover module 1. The upper cover module 1 is internally provided with an upper middle cover 12. A stacker roller 14 is provided on one side of the upper middle cover 12 close to the paper feed 31 of the print channel. A print head assembly 13 is fixedly mounted on one side of the upper middle cover 12 close to the paper exit 32 of the print channel.

The bottom case module 2 includes a bottom case 21 located outside it. A lower middle cover 22 is detachably connected to a top of the bottom case 21. A slide groove 221 in communication with the bottom is disposed on one side, of the upper surface of the lower middle cover 22, located at the paper feed 31. The slide groove 221 is internally connected to a paper limiter 26 and is configured to limit the position of the label paper 3, to prevent printing misalignment. A mounting groove 222 in communication with the bottom is disposed on one side, of the upper surface of the lower middle cover 22, located at the paper exit 32. The mounting groove 222 is internally mounted with a rubber roller shaft 24 configured to guide paper. The bottom case module 2 is further internally mounted with a motor and a transmission mechanism that are configured to drive the rubber roller shaft 24 and a controller configured to control the motor to drive and to control printing, and the controller is electrically connected to the print head assembly 13 and the motor.

The paper limiter 26 includes two racks 261 in the same shape and size and a damping gear 262 meshing with the two racks 261 for transmission. A part of a gear shaft of the damping gear 262 is fixedly connected to an inner side of the lower middle cover 22 of the bottom case module 2. When one of the racks 261 is moved, the other rack 261 is synchronously and reversely driven by using the damping gear 262. A paper limit slider 263 is disposed at one end of each of the two racks 261.

Jaws 16 are respectively disposed at two ends of the print head assembly 13 corresponding to the rubber roller shaft 24. The jaws 16 are engaged with two ends of the rubber roller shaft 24 and are configured to engage the print head assembly 13 with the rubber roller shaft 24 in a position.

An elastic wall 121 is disposed downward at one end, of the upper middle cover 12 of the upper cover module 1, located at an articulating part. The elastic wall 121 is bent downward to form an arc-shaped structure, which abuts against the lower middle cover 22 of the bottom case module 2. One end of the lower middle cover 22 in contact with the elastic wall 121 is inclined inward to form an inclined surface 233. When the upper cover module 1 is rotated upward relative to the bottom case module 2, the elastic wall 121 is elastically deformed. When the upper cover module 1 is rotated upward to the limit, the surface of a tail end of the elastic wall 121 is in contact with the inclined surface 233 of the lower middle cover 22. In this case, the elastic wall 121 and the inclined surface 223 form a support structure, which can support and position the upper cover module 1 and prevent the upper cover module 1 from falling down due to the gravity or touching by mistake.

A tension spring 17 is connected to the toggle hook 15 on the upper cover module 1. One end of the tension spring 17 is connected to the toggle hook 15. The other end is connected to the upper middle cover 12 of the upper cover module 1, which facilitates to automatically reset the toggle hook 15. An open groove 122 is disposed on a side surface of the upper middle cover 12 corresponding to the toggle hook 15. The toggle block of the toggle hook 15 protrudes from the open groove 122, which facilitates to operate the toggle hook 15 to open and lock the upper cover module 1 and the bottom case module 2.

Based on the foregoing description, it can be seen that the embodiments of the present invention have the following technical effects:

1. One end of the upper cover module is hinged with one end of the bottom case module, and the toggle hook at the other end of the upper cover module is connected to the buckle groove of the bottom case module, to open and buckle the printer, which facilitates to replace the printer paper.
2. The print head assembly is provided with the jaws engaged with the rubber roller shaft, to accurately position the heating line and improve the printing accuracy.
3. The elastic wall structure is disposed at one end of the upper middle cover in the upper cover module of the printer. An inclined surface is provided at a corresponding end of the lower middle cover in the lower cover module. When the upper cover module is opened upward to the maximum extent, a tail end of the elastic wall cooperates with the inclined surface to form a support structure to prevent the upper cover module from falling due to the gravity and the like when the upper cover module is opened.

Compared with the prior art, the label printer of the present invention has a smaller overall volume, and after the upper cover module is opened, the space above the paper feed channel is completely unobstructed, which facilitates to replace the paper. In addition, when opened, the upper cover module can be supported well, thereby avoiding the damage on the printer caused by the falling of the upper cover module.

The foregoing descriptions are merely preferred embodiments of the present invention and not intended to limit present invention. For those skilled in the art, the present invention can have various modifications and changes. Any modification, equivalent replacement, improvement, and the like made within the spirit and principle of the present invention shall be included within the protection scope of the present invention.

What is claimed is:

1. A label printer, comprising an upper cover module and a bottom case module configured to cooperate with the upper cover module in printing, wherein the upper cover module is buckled above the bottom case module, one side of the upper cover module is hinged with one side of the bottom case module, and the upper cover module is buckled downward or opened upward along the side hinged with the bottom case module; and an other side of the upper cover module is provided with a toggle hook having a toggle block, the bottom case module is provided with a buckle groove corresponding to a position of the toggle hook, and the toggle hook cooperates with the buckle groove in buckling to lock the upper cover module and the bottom case module;

the upper cover module is internally provided with an upper middle cover; the bottom case module comprises a bottom case, a lower middle cover is detachably connected to a top of the bottom case;

wherein an elastic wall is disposed on an inner side of an articulating part between the upper cover module and the upper middle cover, and the elastic wall is bent downward to form an arc-shaped structure; and one end of the lower middle cover in contact with the elastic wall is inclined inward to form an inclined surface, and when the upper cover module is rotated upward and opened relative to the bottom case module, a lower part of the arc-shaped structure of the elastic wall abuts against the inclined surface.

2. The label printer according to claim 1, wherein when the upper cover module is buckled with the bottom case module, a print channel is formed between the upper cover module and the bottom case module, a paper feed is disposed at one end of the print channel, and a paper exit is disposed at the other end; and the upper cover module comprises an upper cover, the upper cover is disposed outside the upper cover module, the upper middle cover is fixedly connected to the upper cover, a stacker roller is disposed on one side of the upper middle cover, and a print head assembly is mounted on one side of the upper middle cover.

3. The label printer according to claim 2, wherein a slide groove is disposed on one side of an upper surface of the lower middle cover, the slide groove communicates with the inside of the bottom case module, the slide groove is internally provided with a paper limiter, and the paper limiter limits a specific clamping position of a label paper when the label paper enters the printer; a mounting groove is disposed on one side of the upper surface of the lower middle cover, the mounting groove communicates with the inside of the bottom case module, and the mounting groove is internally mounted with a rubber roller shaft configured to guide paper; and the bottom case module is further internally mounted with a motor and a transmission mechanism that are configured to drive the rubber roller shaft and a controller configured to control the motor to drive and to control printing, and the controller is electrically connected to the print head assembly and the motor.

4. The label printer according to claim 3, wherein the paper limiter comprises:

two racks in the same shape and size;

a damping gear, wherein the two racks mesh with the damping gear for transmission, and a part of a gear shaft of the damping gear is fixedly connected to an inner side of the lower middle cover of the bottom case module; and paper limit sliders, disposed at bottoms of the two racks.

5. The label printer according to claim 3, wherein the print head assembly is provided with two jaws, the two jaws correspond to two ends of the rubber roller shaft respectively, and when the upper cover module is closed, the jaws are clamped with the two ends of the rubber roller shaft in a position.

6. The label printer according to claim 3, wherein a tension spring is connected between the toggle hook and the upper cover module, and the tension spring facilitates to automatically reset the toggle hook.

7. The label printer according to claim 6, wherein the upper middle cover is provided with an open groove, and the open groove is disposed at a corresponding position of the toggle hook; and the toggle block of the toggle hook protrudes from the open groove, which facilitates to operate the toggle hook, thereby opening and locking the upper cover module and the bottom case module.

* * * * *